United States Patent
Flöter et al.

(10) Patent No.: US 9,924,730 B2
(45) Date of Patent: Mar. 27, 2018

(54) EDIBLE FAT POWDERS

(75) Inventors: Eckhard Flöter, Vlaardingen (NL); Teunis de Man, Vlaardingen (NL); Cornelis Sjouke Stellema, Vlaardingen (NL)

(73) Assignee: UNILEVER BCS US, INC., Englewood Cliffs, NJ (US)

( * ) Notice: Subject to any disclaimer, the term of this patent is extended or adjusted under 35 U.S.C. 154(b) by 140 days.

(21) Appl. No.: 13/704,279

(22) PCT Filed: May 31, 2011

(86) PCT No.: PCT/EP2011/058922
§ 371 (c)(1),
(2), (4) Date: Jan. 11, 2013

(87) PCT Pub. No.: WO2011/160921
PCT Pub. Date: Dec. 29, 2011

(65) Prior Publication Data
US 2013/0115361 A1    May 9, 2013

(30) Foreign Application Priority Data

Jun. 22, 2010 (EP) .................... 10166774

(51) Int. Cl.
| A23D 7/00 | (2006.01) |
| A23D 9/04 | (2006.01) |
| A23D 7/02 | (2006.01) |
| A23D 7/05 | (2006.01) |
| A23D 9/05 | (2006.01) |

(52) U.S. Cl.
CPC ............... *A23D 9/04* (2013.01); *A23D 7/001* (2013.01); *A23D 7/02* (2013.01); *A23D 7/05* (2013.01); *A23D 9/05* (2013.01)

(58) Field of Classification Search
CPC . A23D 9/04; A23D 7/001; A23D 7/02; A23D 7/05; A23D 9/05
See application file for complete search history.

(56) References Cited

U.S. PATENT DOCUMENTS

| 2,521,219 A | 9/1950 | Procter & Gamble |
| 2,521,242 A | 9/1950 | Mitchell, Jr. |

(Continued)

FOREIGN PATENT DOCUMENTS

| AU | 2004262853 | 6/2008 |
| CA | 2747084 | 6/2016 |

(Continued)

OTHER PUBLICATIONS

Munuklu, P. 2007. Journal of Supercritical Fluids 43:181.*

(Continued)

*Primary Examiner* — Katherine D Leblanc
(74) *Attorney, Agent, or Firm* — Gerard J. McGowan, Jr.

(57) ABSTRACT

The invention relates to an edible fat powder comprising at least two natural fats wherein the natural fat has a N10 of at least 10% and wherein the fat powder is a co-crystallized fat powder. The invention further relates to the use of said fat powder to prepare a fat containing emulsion. The invention also relates to a process for the preparation of said edible fat powder wherein the edible fat powder is prepared from a molten mixture comprising at least two natural fats.

1 Claim, 1 Drawing Sheet

(56) References Cited

U.S. PATENT DOCUMENTS

| | | |
|---|---|---|
| 2,615,160 A | 10/1952 | Baur |
| 2,815,286 A | 12/1957 | Andre et al. |
| 2,892,880 A | 6/1959 | Hohn |
| 3,059,694 A * | 10/1962 | Sietsema ................ B01D 1/18 159/48.2 |
| 3,120,438 A | 2/1964 | McIntire et al. |
| 3,170,799 A | 2/1965 | Feuge |
| 3,270,040 A | 8/1966 | Bradshaw |
| 3,295,986 A | 1/1967 | Saslaw et al. |
| 3,338,720 A | 8/1967 | Pichel |
| 3,392,880 A | 7/1968 | Wilcek |
| 3,425,843 A | 2/1969 | Japikse |
| 3,433,650 A | 3/1969 | Block et al. |
| 3,528,823 A | 9/1970 | Rossen |
| 3,607,305 A | 9/1971 | Westenberg |
| 3,634,100 A | 1/1972 | Fondu et al. |
| 3,881,005 A | 4/1975 | Thakkar et al. |
| 3,892,880 A | 7/1975 | Grolitsch |
| 4,021,582 A | 5/1977 | Hsu |
| 4,160,850 A | 7/1979 | Hallstrom et al. |
| 4,226,894 A | 10/1980 | Gawrilow |
| 4,232,052 A | 11/1980 | Nappen |
| 4,234,577 A | 11/1980 | Zilliken |
| 4,234,606 A | 11/1980 | Gawrilow |
| 4,288,460 A | 9/1981 | Ciliberto et al. |
| 4,292,338 A | 9/1981 | Ainger et al. |
| 4,294,862 A | 10/1981 | Wilke |
| 4,308,288 A | 12/1981 | Hara et al. |
| 4,341,813 A | 7/1982 | Ward |
| 4,366,181 A | 12/1982 | Dijkshoorn et al. |
| 4,375,483 A | 3/1983 | Shuford et al. |
| 4,385,076 A | 5/1983 | Crosby |
| 4,388,339 A | 6/1983 | Lomneth et al. |
| 4,390,561 A | 6/1983 | Blair et al. |
| 4,391,838 A | 7/1983 | Pate |
| 4,469,710 A * | 9/1984 | Rielley et al. ................ 426/541 |
| 4,486,457 A | 12/1984 | Schijf et al. |
| 4,501,764 A | 2/1985 | Gercama et al. |
| 4,578,274 A | 3/1986 | Sugisawa et al. |
| 4,591,507 A | 5/1986 | Bodor et al. |
| 4,826,699 A | 5/1989 | Soe |
| 4,855,157 A | 8/1989 | Tashiro et al. |
| 4,889,740 A | 12/1989 | Price |
| 4,917,915 A | 4/1990 | Cain et al. |
| 4,933,192 A * | 6/1990 | Darling et al. ................ 426/98 |
| 4,990,355 A | 2/1991 | Gupta et al. |
| 5,127,953 A | 7/1992 | Hamaguchi |
| 5,130,156 A | 7/1992 | Bergquist |
| 5,185,173 A | 2/1993 | Bethke et al. |
| 5,186,866 A | 2/1993 | Ryuo et al. |
| 5,302,408 A | 4/1994 | Cain et al. |
| 5,352,475 A | 10/1994 | Tholl |
| 5,374,445 A | 12/1994 | Havenstein et al. |
| 5,391,382 A | 2/1995 | Chappell |
| 5,429,836 A | 7/1995 | Fuisz |
| 5,447,735 A | 9/1995 | Miller |
| 5,451,421 A | 9/1995 | Tanihara et al. |
| 5,516,543 A | 5/1996 | Amankonah et al. |
| 5,620,734 A | 4/1997 | Wesdorp et al. |
| 5,707,670 A | 1/1998 | Mehansho et al. |
| 5,858,445 A | 1/1999 | Huizinga et al. |
| 5,866,192 A | 2/1999 | Uesugi et al. |
| 5,904,949 A | 5/1999 | Reddy et al. |
| 5,916,608 A | 6/1999 | Lanting et al. |
| 5,916,808 A | 6/1999 | Kole et al. |
| 5,972,412 A | 10/1999 | Sassen et al. |
| 5,985,350 A | 11/1999 | Gubler et al. |
| 6,020,003 A | 2/2000 | Stroh et al. |
| 6,031,118 A | 2/2000 | van Amerongen et al. |
| 6,056,791 A | 5/2000 | Weidner et al. |
| 6,077,558 A | 6/2000 | Euber |
| 6,106,885 A | 8/2000 | Huizinga et al. |
| 6,106,886 A | 8/2000 | van Amerongen et al. |
| 6,117,475 A | 9/2000 | van Amerongen et al. |
| 6,117,478 A | 9/2000 | Dubberke |
| 6,129,944 A | 10/2000 | Tiainen et al. |
| 6,156,370 A | 12/2000 | Huizinga et al. |
| 6,159,525 A | 12/2000 | Lievense et al. |
| 6,171,636 B1 | 1/2001 | Sassen et al. |
| 6,187,578 B1 | 2/2001 | Blinkovsky et al. |
| 6,190,680 B1 | 2/2001 | Sakurada et al. |
| 6,214,406 B1 | 4/2001 | Reimerdes |
| 6,217,920 B1 | 4/2001 | van Eendenburg et al. |
| 6,238,723 B1 | 5/2001 | Sassen et al. |
| 6,248,389 B1 | 6/2001 | Biller et al. |
| 6,284,302 B1 | 9/2001 | Berger et al. |
| 6,312,752 B1 | 11/2001 | Lansbergen et al. |
| 6,316,030 B1 | 11/2001 | Kropf et al. |
| 6,322,842 B1 | 11/2001 | Reddy et al. |
| 6,352,737 B1 | 3/2002 | Dolhaine et al. |
| 6,395,324 B1 | 5/2002 | Effey et al. |
| 6,403,144 B1 | 6/2002 | El-Khoury et al. |
| 6,423,326 B1 | 7/2002 | Shapiro |
| 6,423,363 B1 | 7/2002 | Traska et al. |
| 6,440,336 B1 | 8/2002 | Weinreich et al. |
| 6,468,578 B1 | 10/2002 | Bodor et al. |
| 6,531,173 B2 | 3/2003 | Brooker |
| 6,533,252 B1 | 3/2003 | Bernard et al. |
| 6,582,749 B2 | 6/2003 | Merrick et al. |
| 6,616,849 B1 | 9/2003 | Osajima et al. |
| 6,743,450 B2 | 6/2004 | Romanczyk, Jr. et al. |
| 6,753,032 B1 | 6/2004 | Hirokawa et al. |
| 6,800,317 B2 | 10/2004 | Wester et al. |
| 6,808,737 B2 | 10/2004 | Ullanoormadam |
| 6,827,964 B2 | 12/2004 | Wester et al. |
| 6,929,816 B2 | 8/2005 | Wester |
| 6,986,846 B2 | 1/2006 | Shekunov et al. |
| 6,986,886 B2 | 1/2006 | Hammond et al. |
| 7,056,949 B2 * | 6/2006 | Koike et al. ................ 514/549 |
| 7,118,773 B2 | 10/2006 | Floeter et al. |
| 7,223,435 B2 | 5/2007 | Besselink et al. |
| 7,575,768 B2 | 8/2009 | Perlman et al. |
| 7,601,184 B2 | 10/2009 | Tischendorf |
| 7,618,670 B2 | 11/2009 | Ullanoormadam |
| 7,807,208 B2 | 10/2010 | Ullanoormadam |
| 7,862,751 B2 | 1/2011 | Foster et al. |
| 8,025,913 B2 | 9/2011 | van den Berg et al. |
| 8,124,152 B2 | 2/2012 | Janssen et al. |
| 8,147,895 B2 | 4/2012 | Barendse et al. |
| 8,211,470 B2 | 7/2012 | Kim |
| 8,431,370 B2 | 4/2013 | ten Brink et al. |
| 8,586,122 B2 | 11/2013 | McNeill et al. |
| 8,927,045 B2 | 1/2015 | Barendse et al. |
| 8,940,355 B2 | 1/2015 | van den Berg et al. |
| 2001/0029047 A1 | 10/2001 | Liu et al. |
| 2002/0034577 A1 | 3/2002 | Vogensen et al. |
| 2002/0048606 A1 | 4/2002 | Zawistowski |
| 2002/0076476 A1 | 6/2002 | Kuil et al. |
| 2002/0132035 A1 | 9/2002 | Tamarkin et al. |
| 2002/0168450 A1 | 11/2002 | Drudis et al. |
| 2003/0064141 A1 | 4/2003 | Brooker |
| 2003/0068425 A1 | 4/2003 | Khare |
| 2003/0124228 A1 | 7/2003 | Goto et al. |
| 2003/0124288 A1 | 7/2003 | Merziger et al. |
| 2003/0165572 A1 | 9/2003 | Auriou |
| 2003/0203854 A1 | 10/2003 | Pischel et al. |
| 2004/0076732 A1 | 4/2004 | Valix |
| 2004/0101601 A1 | 5/2004 | Loh et al. |
| 2004/0105931 A1 | 6/2004 | Basheer et al. |
| 2004/0126475 A1 | 7/2004 | Hashizume et al. |
| 2004/0166204 A1 | 8/2004 | Smith et al. |
| 2004/0197446 A1 | 10/2004 | Haynes et al. |
| 2005/0014158 A1 | 1/2005 | Adam et al. |
| 2005/0069619 A1 | 3/2005 | Bot et al. |
| 2005/0069625 A1 | 3/2005 | Chimel et al. |
| 2005/0123667 A1 | 6/2005 | Sakuma et al. |
| 2005/0170062 A1 | 8/2005 | Burling et al. |
| 2005/0175745 A1 | 8/2005 | Zawistowski |
| 2005/0196512 A1 | 9/2005 | Nakhasi et al. |
| 2005/0271791 A1 | 12/2005 | Wright et al. |
| 2006/0019021 A1 | 1/2006 | Plank et al. |
| 2006/0035871 A1 | 2/2006 | Auweter et al. |
| 2006/0051479 A1 | 3/2006 | Chiavazza et al. |
| 2006/0115553 A1 | 6/2006 | Gautam et al. |

(56) References Cited

U.S. PATENT DOCUMENTS

| | | | |
|---|---|---|---|
| 2006/0280855 A1 | 12/2006 | Van Den Berg et al. | |
| 2007/0054028 A1 | 3/2007 | Perlman et al. | |
| 2007/0087085 A1 | 4/2007 | Sarma et al. | |
| 2007/0154617 A1* | 7/2007 | Lansbergen | 426/601 |
| 2007/0254088 A1 | 11/2007 | Stewart et al. | |
| 2007/0286940 A1 | 12/2007 | Herzing et al. | |
| 2008/0089978 A1 | 4/2008 | Grigg et al. | |
| 2008/0187645 A1 | 8/2008 | Ekblom et al. | |
| 2008/0193628 A1 | 8/2008 | Garbolino et al. | |
| 2008/0193638 A1 | 8/2008 | McMaster et al. | |
| 2008/0226786 A1 | 9/2008 | Ward et al. | |
| 2008/0268130 A1 | 10/2008 | Bons et al. | |
| 2008/0274175 A1 | 11/2008 | Schramm et al. | |
| 2008/0317917 A1 | 12/2008 | Janssen et al. | |
| 2009/0022868 A1 | 1/2009 | Van Den Bremt et al. | |
| 2009/0029024 A1 | 1/2009 | McNeill et al. | |
| 2009/0041898 A1 | 2/2009 | Garbolino et al. | |
| 2009/0123633 A1* | 5/2009 | Cleenewerck et al. | 426/607 |
| 2009/0136645 A1 | 5/2009 | Garbolino | |
| 2009/0263559 A1 | 10/2009 | Van Horsen et al. | |
| 2010/0040737 A1 | 2/2010 | Radio et al. | |
| 2010/0159079 A1 | 6/2010 | Qvyjt | |
| 2011/0070335 A1 | 3/2011 | Brugger et al. | |
| 2011/0244111 A1 | 10/2011 | Den Adel et al. | |
| 2011/0287156 A1 | 11/2011 | Perlman | |
| 2011/0287160 A1 | 11/2011 | Dobenesque et al. | |
| 2011/0311706 A1 | 12/2011 | van den Berg et al. | |
| 2011/0311707 A1 | 12/2011 | Bezemer et al. | |
| 2012/0018535 A1 | 1/2012 | Wubbolts et al. | |
| 2013/0004522 A1 | 1/2013 | Dvir et al. | |
| 2013/0115361 A1 | 5/2013 | Floter et al. | |

FOREIGN PATENT DOCUMENTS

| | | |
|---|---|---|
| DE | 2253515 | 5/1974 |
| DE | 3220916 | 12/1983 |
| DE | 10253111 | 5/2004 |
| DE | 10253193 | 6/2004 |
| EP | 0021483 | 1/1981 |
| EP | 0041299 | 1/1983 |
| EP | 0089082 | 9/1983 |
| EP | 0063835 | 4/1985 |
| EP | 0237120 | 9/1987 |
| EP | 0294692 | 12/1988 |
| EP | 0327120 | 8/1989 |
| EP | 0393963 | 10/1990 |
| EP | 0505007 | 9/1992 |
| EP | 0289069 | 3/1993 |
| EP | 0327225 | 7/1993 |
| EP | 0572051 | 12/1993 |
| EP | 0775444 | 5/1997 |
| EP | 0780058 | 6/1997 |
| EP | 0796567 | 9/1997 |
| EP | 0744992 | 10/1997 |
| EP | 0898896 | 3/1999 |
| EP | 0594152 | 2/2000 |
| EP | 1114674 A2 | 7/2001 |
| EP | 1238589 | 9/2002 |
| EP | 1285584 A2 | 2/2003 |
| EP | 0962150 | 8/2003 |
| EP | 1419698 | 5/2004 |
| EP | 1419811 | 5/2004 |
| EP | 1557090 | 7/2005 |
| EP | 1651338 | 5/2006 |
| EP | 1795257 | 6/2007 |
| EP | 1815752 | 8/2007 |
| EP | 1180545 | 9/2007 |
| EP | 2016834 | 1/2009 |
| EP | 2123164 | 11/2009 |
| EP | 2181604 | 5/2010 |
| EP | 1197153 | 3/2011 |
| EP | 0897671 | 7/2011 |
| EP | 1865786 | 11/2011 |
| FR | 2243653 | 4/1975 |
| FR | 2776167 | 9/1999 |
| GB | 1114674 | 5/1968 |
| GB | 1537011 | 12/1978 |
| GB | 1538958 | 1/1979 |
| GB | 2095966 | 10/1982 |
| GB | 2095968 | 10/1982 |
| GB | 2177283 | 1/1987 |
| GB | 2208296 | 3/1989 |
| GB | 2208378 | 11/1991 |
| GB | 2292949 | 3/1996 |
| GB | 2320175 | 6/1998 |
| JP | 5951742 | 3/1984 |
| JP | 62239949 | 10/1987 |
| JP | 2299544 | 12/1990 |
| JP | 2003210107 | 7/2003 |
| WO | WO9308699 | 5/1993 |
| WO | WO9521688 | 8/1995 |
| WO | WO9638047 | 12/1995 |
| WO | WO9614755 | 5/1996 |
| WO | WO9619115 | 6/1996 |
| WO | WO9742830 | 11/1997 |
| WO | WO9813133 | 4/1998 |
| WO | WO9847386 | 10/1998 |
| WO | WO9956558 | 11/1999 |
| WO | WO0009636 | 2/2000 |
| WO | W00021490 | 4/2000 |
| WO | WO0021490 | 4/2000 |
| WO | WO0045648 | 8/2000 |
| WO | WO0041491 | 12/2000 |
| WO | WO0100046 | 1/2001 |
| WO | WO0132035 | 5/2001 |
| WO | WO0143559 | 6/2001 |
| WO | WO0166560 | 9/2001 |
| WO | WO0191569 | 12/2001 |
| WO | WO0178529 | 3/2002 |
| WO | WO02100183 | 12/2002 |
| WO | WO03043430 | 5/2003 |
| WO | WO03084337 | 10/2003 |
| WO | WO03096817 | 11/2003 |
| WO | WO03103633 | 12/2003 |
| WO | WO2004068959 | 8/2004 |
| WO | WO2004093571 | 11/2004 |
| WO | WO2005014158 | 2/2005 |
| WO | WO2005051089 | 6/2005 |
| WO | WO2005071053 | 8/2005 |
| WO | WO2005074717 | 8/2005 |
| WO | WO2005074726 | 8/2005 |
| WO | WO2006005141 | 2/2006 |
| WO | WO2006066979 | 6/2006 |
| WO | WO2006/087091 * | 8/2006 |
| WO | WO2006079445 | 8/2006 |
| WO | WO2006087092 | 8/2006 |
| WO | WO2006087093 | 8/2006 |
| WO | WO2006134152 | 12/2006 |
| WO | WO2007022897 | 3/2007 |
| WO | WO2007024770 | 4/2007 |
| WO | WO2007039020 | 4/2007 |
| WO | WO2007039040 | 4/2007 |
| WO | WO2007096211 | 8/2007 |
| WO | WO2007096243 | 8/2007 |
| WO | WO2008125380 | 10/2008 |
| WO | WO2009068651 | 6/2009 |
| WO | WO2010053360 | 5/2010 |
| WO | WO2010060713 | 6/2010 |
| WO | WO2010069746 | 6/2010 |
| WO | WO2010069747 | 6/2010 |
| WO | WO2010069750 | 6/2010 |
| WO | WO2010069751 | 6/2010 |
| WO | WO2010069752 | 6/2010 |
| WO | WO2010069753 | 6/2010 |
| WO | WO2011160921 | 12/2011 |

OTHER PUBLICATIONS

Elvers et al, Margarins and shortenings, Ullmanns Encyclopedia of Industrial Chemistry, 1990, 156-158, 5th Edition, vol. A16.

Garti et al, Stabilization of water-in-oil Emulsions by Submicrocrystalline$\alpha$-Form Fat Particles, Journal of the American Oil Chemists Society, 1998, 1825-1831, 75 No. 12.

(56) References Cited

OTHER PUBLICATIONS

P. Munuklu et al, Particle formation of edible fats using the supercritical melt micronization process (ScMM), Journal of Supercritical Fluids, 2007, 181-190, 43.
European Search Report Application No. EP10166774 dated Dec. 3, 2010.
International Search Report for International Application No. PCT/EP2011/058922 dated Sep. 15, 2011.
Davidsson, "Powdered fats for soups and sauces—and a range of other food products", Food Ingredients and Analysis International, 2001, 23 (4) pp. 29-30.
Anna Von Bonsdorff-Nikander, Studies on a Cholesterol-Lowering Microcrystalline Physiosterol Suspension in Oil, Division of Pharmaceutical Technology Faculty of Pharmacy, Feb. 12, 2005, 12, 28-30, 35-44.
Christiansen et al, Cholesterol-lowering effect of spreads enriched with microcrystalline plant sterols in hypercholesterolemic subject, European Journal of Nutrition, 2001, 66-73, 40.
Hayes et al, Nonesterified Phytosterols Dissolved and Recrystallized in Oil Reduce Plasma Cholesterol in Gerbils and Humans, The journal of Nutrition, Jun. 1, 2006, 1395-1399, 134 No. 6, US.
IRPR2 in PCTEP2011058922, dated Jul. 6, 2012.
Ribeiro et al., Zero trans fats from soybean oil and fully hydrogenated soybean oil: Physico-chemical properties and food applications, Food Research International, 2009, pp. 401-410, 42.
Shurtleff et al., History of Soy Oil Hydrogenation and of Research on the Safety of Hydrogenated Vegetable Oils SoyInfo Center, 2007, pp. 1-9.
Van Den Enden, A method for the determination of the solid phase content of fats using pulse nuclear magnetic resonance, Fette Seifen Anstrichmittel, 1978, pp. 180-186, vol. 80.
Von Bonsdorff et al, Optimizing the Crystal Size and Habit of β-Sitosterol in Suspension, AAPS PharmSciTech, 2003, 1-8, 4 (3).
Written Opinion in EP10166774, dated Dec. 3, 2010.
Written Opinion in PCTEP2011058922, dated Sep. 15, 2011.
Declaration in U.S. Appl. No. 13/133,954, Mar. 17, 2014.
Co-pending application Dobenesque et al., U.S. Appl. No. 13/139,584, filed Dec. 1, 2009.
Nutrition: Today's challenges and opportunities, Leatherhead Food International, Jun. 2008, pp. 1-6, vol. 42 No. 5, US.
The prilling process with liquid nitrogen, Jet Priller, Jun. 23, 2010, pp. 1-2, ., Linde, US.
Anonymous, Particle Sizes of Milk Powders Part I, Dairy Products Technolgoy Center Dairy Ingredients Applications Program, Apr. 2000, pp. 1-2, vol. 2 No. 4.
Belitz et al., Milk and Dairy Products, Food Chemistry, 1999, pp. 470-474 and pp. 497-498XP002264854.
Charteris et al., Edible table (bio) spread containing potentially probiotic *Lactobacillus* and *Bifidobacterium* species, International Journal of Dairy Technology, Feb. 2002, pp. 44-56XP002635276, vol. 55 No. 1.
Christoph et al., Glycerol, Ullmann's Encyclopedia of Industrial Chemistry, 2012, pp. 67-82. NB: only relevant pp. 67-69 and 79., vol. 17, Wiley-VCH Verlag GmbH & Co. KGaA, Weinheim.
D. Chapman, The Polymorphism of Glycerides, University Chemical Laboratory Chemical Reviews, Dec. 2, 1961, pp. 433-456, 62.
De Graaf et al., Consumption of tall oil-derived phytosterols in a chocolate matrix significantly decreases plasma total and low-density lipoprotein-cholesterol levels, British Journal of Nutrition, 2002, pp. 479-488.
Experimental and Analytical Facilities, Delft University of Technology, Dec. 16, 2005, pp. 41-51.
Ferguson et al., The Polymorphic Forms or Phases of Triglyceride Fats, Chemical Reviews, 1941, pp. 355-384.
Fischer, Formulation challenges in Ice Cream Gelling and thickening systems and their applications fruit preparations, Food Ingredients and Analysis International, 2001, pp. 29-31, vol. 23 No. 3.
Fischer, Improved fruit fibres for modern food processing, Food Ingredients and Analysis International, 2001, pp. 29-31, vol. 23 No. 3.
Formo et al., Bailey's Industrial Oil and Fat Products, Bailey's Industiral Oil and Fat Products, 1979, pp. 317, 326, 377, 382, 398, vol. 1 4th Edition.
Formo et al., Composition and Characteristics of Individual Fats and Oils, Bailey's Industrial Oil and Fat Products, 1979, pp. 382-384, vol. 1 4th Edition.
Gerber et al., Effect of Process-Parameters on Particles Obtained by the Rapid Expansion of Supercritical Solutions, World Congress on Oil Particle Technology, 1998, pp. 1-11XP001080632.
Gunstone et al., Analytical Methods Slip Point, The Lipid Handbook, 1994, pp. 321-322, 2nd Edition.
Gunstone et al., Food uses of oils and fats, The Lipid Handbook, 2007, pp. 336-341, 3rd Edition.
Gunstone et al., Occurrence and characterisation of oils and fats, The Lipid Handbook, 2007, pp. 49-53, 3rd Edition.
Gunstone et al., Occurrence and Characterisation of Oils and Fats, The Lipid Handbook, 2007, pp. 51, 55, 63, 66, 67, 3rd Edition.
Gunstone et al., Polymorphism and nomenclature of lipid crystal forms, The Lipid Handbook, 1995, pp. 405, 2nd Edition.
Gunstone, Lipids in Foods, Lipids in Foods Chemistry, Biochemistry and Technology, 1983, pp. 154.
Hasenhuettl et al., Starch, Food Emulsifiers and Their Applications, 2007, pp. 274-275, Second Edition.
Hui, Bailey's Industrial Oil and Fat Products, Bailey's Industrial Oil and Fat Products, 1996, pp. 484-485, 1-5th edition US.
Hydrogenation, Wikipedia, pp. 1-10.
Interesterified Fat, Wikipedia, pp. 1-4.
IPRP 1 in PCTEP2011071150, dated Feb. 25, 2013.
IPRP in PCTEP2009066104, dated Sep. 28, 2010, WO.
IPRP in PCTEP2009066105, dated Mar. 24, 2011.
IPRP in PCTEP2011071150, dated Apr. 23, 2013.
IPRP1 in PCTEP2009066093, dated Jun. 21, 2011.
IPRP1 in PCTEP2009066098, dated Jun. 21, 2011.
IPRP1 in PCTEP2009066107, dated Jun. 21, 2011.
IPRP1 in PCTEP2011070933, dated Jun. 18, 2013.
IPRP2 in PCTEP2004006544, dated Jan. 3, 2006, WO.
IPRP2 in PCTEP2006000800, dated Jun. 27, 2007, WO.
IPRP2 in PCTEP2006000801, dated Mar. 20, 2007
IPRP2 in PCTEP2009066095, dated Mar. 24, 2011, WO.
IPRP2 in PCTEP2009066105, dated Mar. 24, 2011.
IPRP2 in PCTEP2011065601, dated Sep. 24, 2012, WO.
IPRP2 in PCTEP2011070948, dated Mar. 11, 2013, WO.
IPRP2 in PCTEP2011071168, dated Sep. 5, 2012.
IPRP2 in PCTEP2011071397, dated Mar. 21, 2013.
Johansson et al., Water-in-Triglyceride Oil Emulsions. Effect of Fat Crystals on Stability, JAOCS Journal of the American Oil Chemists' Society, 1995, pp. 939-950, vol. 72 No. 8.
Lipson et al., Analysis of the Broadening of Powder Lines, Interpretation of X-Ray Powder Diffraction Patterns, 1970, pp. 244-263.
Lopez et al., Milk fat and primary fractions obtained by dry fractionation 1. Chemical composition and crystallisation properties, Chemistry and Physics of Lipids, Oct. 2006, pp. 17-33, vol. 144, Issue 1.
Lowe, Experimental Cookery, Experimental Cookery, 1955, pp. 270-273, 4th edition, ., US.
M. Dervisoglu and F. Yazici, The Effect of Citrus Fibre on the Physical, Chemical and Sensory Properties of Ice Cream, Food Science and Technology International, Apr. 2006, pp. 159-164—with abstract, 12.
Micaleff et al, Beyond blood lipids phytosterols statins and omega-3 polyunsaturated fatty acid therapy for hyperlipidemia, Journal of Nutrional Biochemistry, 2009, pp. 927-939; XP026755870, vol. 20.
Munuklu et al., Particle formation of an edible fat (rapeseed 70) using the supercritical melt micronization (ScMM) process, The Journal of Supercritical Fluids, Apr. 2007, pp. 433-442, vol. 40, Issue 3.
Munuklu et al., Supercritical Melt Micronization Using theParticles from Gas Saturated Solution Process, American Society Symposium, 2003, pp. 353-369.
Nathalie De Cock, Structure development in confectionery products: importance of triacylglycerol composition, Universiteit Gent Faculteit Bio-ingenieurswetenschappen, 2011, pp. 1-72.

(56) References Cited

OTHER PUBLICATIONS

Norizzah et al., Effects of chemical interesterification on physicochemical properties of palm stearin and palm kernel olein blends, Food Chemistry, 2004, pp. 229-235, 86.
Notice of Opposition from Feyecon Development & Implementation BV in EP06706499, dated Aug. 30, 2012.
Notice of Opposition from Kerry Group Services Intl Ltd in EP06706499, dated Aug. 30, 2012.
Pernetti et al., Structuring of edible oils by alternatives to crystalline fat, Current Opinion in Colloid & Interface Science, Oct. 2007, pp. 221-231, vol. 12, Issues 4-5.
S. P. Kochhar, Influence of Processing on Sterols of Edible Vegetable Oils, Prog Lipid Res, 1983, pp. 161-188, vol. 22.
Search Report in EP03077247, dated Apr. 7, 2004.
Search Report in EP05075384, dated Jul. 5, 2005, EP.
Search Report in EP05075393, dated Jul. 20, 2005.
Search report in EP06122483, dated Jul. 15, 2008, EP.
Search Report in EP08172283, dated Jun. 5, 2009.
Search Report in EP08172284, dated Jun. 4, 2009, EP.
Search Report in EP08172286, dated May 20, 2009, EP.
Search Report in EP08172298, dated Apr. 9, 2009, EP.
Search Report in EP08172300, dated Jun. 5, 2009.
Search Report in EP08172304, dated May 28, 2009.
Search Report in EP10181979, dated Nov. 17, 2010.
Search Report in EP10195564, dated May 20, 2011, EP.
Search Report in EP10195567, dated May 24, 2011.
Search Report in EP10195650, dated May 4, 2011.
Search Report in EP10195655, dated Jun. 15, 2011, EP.
Search Report in EP10196443, dated May 27, 2011.
Search Report in EP10196444, dated May 25, 2011.
Search Report in PCTEP2004006544, dated Jan. 28, 2005, WO.
Search Report in PCTEP2006000800, dated Aug. 2, 2006, WO.
Search Report in PCTEP2006000801, dated Aug. 11, 2006, WO.
Search Report in PCTEP2009066093, dated Mar. 17, 2010.
Search Report in PCTEP2009066095, dated Mar. 23, 2010, WO.
Search Report in PCTEP2009066098, dated Mar. 17, 2010.
Search Report in PCTEP2009066104, dated Jan. 14, 2010, WO.
Search Report in PCTEP2009066105, dated Jan. 28, 2010.
Search Report in PCTEP2009066107, dated Jan. 12, 2010, WO.
Search Report in PCTEP2011065601, dated Oct. 21, 2011.
Search Report in PCTEP2011070933, dated Mar. 21, 2012, WO.
Serach Report in PCTEP2011070948, dated Feb. 9, 2012, WO.
Search Report in PCTEP2011071150, dated Jan. 30, 2012.
Search Report in PCTEP2011071168, dated Feb. 9, 2012.
Search Report in PCTEP2011071282, dated Jan. 25, 2012.
Search Report in PCTEP2011071397, dated Feb. 9, 2012.
Shahidi et al., Margarine processing plants and equipment, Edible Oil and Fat Product, Margarine processing plants and equipment, 2005, pp. 502, 518.
Starches, Tate & Lyle Product Brochure, 2009, pp. 1-16.
Strawberry Powder Flavor GA1403, Strawberryflavor.com, 2005, pp. 1.
The American Heritage Dictionary, 1982, pp. 407, 1225, 2nd College Edition.
Turk et al., Micronization of pharmaceutical substances by the Rapid Expansion of Supercritical Solutions (RESS): A promising method to improve bioavailability of poorly soluble pharmaceutical agents, The Journal of Supercritical Fluids, Jan. 2002, pp. 75-84, vol. 22 Issue 1.
Van Den Enden et al., Rapid Determination of Water Droplet Size Distributions by PFG-NMR, Journal of Colloid and Interface Science, Nov. 1990, pp. 105-113, vol. 140 No. 1.
Van Den Enden, A Method for the Determin of the Solid Phase Content of Fats Using Pulse Nuclear Magnetic Resonance, Fette Seifen Anstrichmittel, 1978, 180, 5, US.
Written Opinion in EP03077247, dated Apr. 7, 2004.
Written Opinion in EP05075384, dated Jul. 5, 2005.
Written Opinion in EP05075393, dated Jul. 20, 2005.
Written Opinion in EP06122483, dated Jul. 15, 2008, EP.
Written opinion in EP08172283, dated Jun. 5, 2009.
Written Opinion in EP08172284, dated Jun. 4, 2009, EP.
Written Opinion in EP08172286, dated May 20, 2009, EP.
Written Opinion in EP08172298, dated Apr. 9, 2009, EP.
Written Opinion in EP08172300, dated Jun. 5, 2009.
Written Opinion in EP08172304, dated May 28, 2009.
Written Opinion in EP10181979, dated Nov. 11, 2010.
Written Opinion in EP10195564, dated May 20, 2011, EP.
Written Opinion in EP10195567, dated May 24, 2011.
Written Opinion in EP10195655, dated Jun. 15, 2011.
Written Opinion in EP10196443, dated May 27, 2011.
Written Opinion in EP10196444, dated May. 25, 2011, EP.
Written Opinion in PCTEP2004006544, dated Jan. 28, 2005, WO.
Written Opinion in PCTEP2006000800, dated Aug. 2, 2006, WO.
Written Opinion in PCTEP2006000801, dated Aug. 11, 2006.
Written Opinion in PCTEP2009066093, dated Mar. 17, 2010.
Written Opinion in PCTEP2009066095, dated Mar. 23, 2010, WO.
Written Opinion in PCTEP2009066098, dated Mar. 17, 2010.
Written Opinion in PCTEP2009066104, dated Jan. 14, 2010, WO.
Written Opinion in PCTEP2009066105, dated Jan. 28, 2010.
Written Opinion in PCTEP2009066107, dated Jan. 12, 2010, WO.
Written Opinion in PCTEP2011065601, dated Oct. 21, 2011.
Written Opinion in PCTEP2011070933, dated Mar. 21, 2012, WO.
Written Opinion in PCTEP2011070948, dated Feb. 9, 2012, WO.
Written Opinion in PCTEP2011071150, dated Jan. 30, 2012.
Written Opinion in PCTEP2011071168, dated Feb. 9, 2012.
Written Opinion in PCTEP2011071282, dated Jan. 25, 2012.
Written Opinion in PCTEP2011071397, dated Feb. 9, 2012.

* cited by examiner

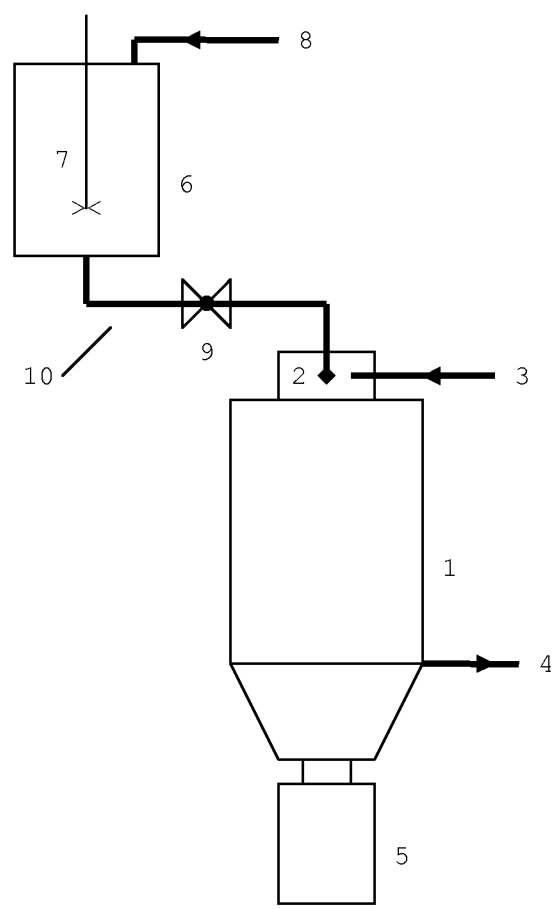

EDIBLE FAT POWDERS

FIELD OF THE INVENTION

The present invention relates to edible fat powders, use of such edible fat powders to prepare a fat containing emulsion and a process for the preparation of such edible fat powders.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case in for example a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Important aspects of a fat continuous spread like for example margarine and low fat spread, the low fat spread usually comprising from 10 to 40 wt % fat on total composition, are for example hardness, spreadability and ability to withstand temperature cycling. Temperature cycling means that the product is subjected to low and high temperatures (e.g. when the consumer takes the product out of the refrigerator and leaves it for some time at the table to use it). This may have a negative influence on the structure of the spread (like for example destabilization of the emulsion or oil-exudation).

Generally edible fat continuous food products like for example margarines and similar edible fat continuous spreads are prepared according to known processes that encompass the following steps:

1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

The choice of fats that can practically be used as structuring agent is rather limited. If the melting point of the structuring agent is too high the melting properties in the mouth are unsatisfactory. If on the other hand, the melting point is too low, the emulsion stability will be negatively affected.

Triacylglycerols (TAG) are the major constituents of natural fats and oils and are esters of glycerol and fatty acids. The chemical structure of the fatty acid and the distribution of the fatty acids over the glycerol backbone determine (at least partly) the physical properties of a fat. The physical properties of fats, like for example the solid fat content (SFC) expressed as N-value, can be modified by altering the chemical structure of the fat. Well known techniques that are widely used include hydrogenation and interesterification.

Hydrogenation alters the degree of unsaturation of the fatty acids and as such alters the fatty acid composition. This allows e.g. plastic fats to be made from liquid oils. A draw back of hydrogenation, especially of partial hydrogenation, is the formation of by products like e.g. trans fatty acids. Furthermore additional process steps are required and some consumers perceive a chemical process such as hydrogenation as undesirable.

Interesterification retains the fatty acid composition but alters the distribution of the fatty acids over the glycerol backbones. Interesterification can be done chemically or with the aid of enzymes. Usually a mixture of two different fats, that by themselves are not or less suitable as a structuring fat, is subjected to interesterification. The resulting interesterified fat will have improved structuring properties compared to the starting materials. A draw back of interesterification may be the formation of by products like e.g. free fatty acids and diglycerides. Also enzymatic interesterification introduces additional process steps which may be complicated and introduce additional costs. Furthermore some consumers perceive chemically modified fats as unnatural and therefore undesirable.

Alternative processes have been described wherein the structuring fat is added as fat powder (i.e. crystallized fat) thereby eliminating the need to heat the whole composition to above the melting temperature of the structuring fat.

EP 1285584 A2 discloses a method to prepare a margarine encompassing taking the solid fat component, together with a minimal amount of the oil phase, cryogenically re-crystallizing it and then combining it with an emulsion of the aqueous phase dispersed in the remainder of the oil phase or by adding the oil and aqueous phases sequentially. The disclosed shortenings and spreads contain relatively high levels of structuring fat (e.g. 25 wt % or more). Furthermore, the structuring fats are partly or fully hydrogenated.

Food Ingredients and Analysis International Vol. 23 No. 4 pages 29-30 (2001) describes powdered fats based on cryogenic technology that can be used for example in pourable margarines and different types of soft fat spreads. It is however mentioned that powdered fats may be used in combination with liquid oil, but for optimal performance these products need a specially designed fat composition which is crystallized from the melt. This will give the best structure of the crystal fraction, and allows a stabilizing network of crystals to be formed during cooling.

EP 1651338 A1 discloses a process for the preparation of an edible dispersion like for example margarine, wherein the dispersion is formed by mixing oil, solid structuring agent particles and an aqueous phase and/or solid phase. The solid structuring agent particles have a microporous structure of submicron size particles. The solid structuring agent particles can be prepared using a micronisation process.

It is an object of the present invention to provide edible fats that are suitable as structuring fats that require less or no chemical modification.

Another object of the present invention is to provide edible fats that are suitable as structuring fats that are easy to make and/or require less and/or less expensive and/or less complicated process steps.

Yet another object of the present invention is to provide alternative edible fats that are suitable as structuring fats.

Still another object of the present invention is to provide alternative edible fats that are suitable as structuring fats and have improved structuring properties.

SUMMARY OF THE INVENTION

It was found that one or more of the above objects is attained by a co-crystallized fat powder.

Accordingly in a first aspect the invention relates to an edible fat powder comprising at least two natural fats wherein the natural fat has a N10 of at least 10% and wherein the fat powder is a co-crystallized fat powder.

The invention also relates to the use of a co-crystallized fat powder to prepare a fat containing emulsion.

The invention further relates to a process for the preparation of a co-crystallized fat powder.

DETAILED DESCRIPTION OF THE INVENTION

Weight percentage (wt %) is based on the total weight of the composition unless otherwise stated.

The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' refers to a fat that is solid at ambient temperature.

Edible fat powder according to the invention comprise at least two natural fats wherein the natural fat has a N10 of at least 10% and wherein the fat powder is a co-crystallized fat powder.

At Least Two Natural Fats

For the purpose of the invention the term 'natural fat' is defined as a fat obtained from a natural source wherein the fat has not been subjected to partial hydrogenation. As such fully hydrogenated fats and oils are encompassed in the term 'natural fat'. However, even though complete hydrogenation does not suffer from the drawback of (excessive) trans fatty acid formation, some consumers perceive this as undesirable. Therefore, the natural fat preferably is a fat that has not been subjected to any kind of hydrogenation.

The natural fat itself may have been subjected to inter-esterification (i.e. intra-esterification, like for example the interesterification of palm oil), but the mixture of two or more natural fats may not have been subjected to interest-erification (i.e. inter-esterification, like for example the interesterification of mixture of palm oil and palm kernel oil). Preferably the natural fat has not been subjected to a process to modify the fatty acid distribution of the triacylglycerols.

More preferably the natural fat is a fat that has not been subjected to any kind of treatment with the purpose to modify the chemical structure of the fat.

Fat obtained from sources that are a result of plant breeding or genetic engineering is defined as a natural fat for the purpose of this invention. Some consumers perceive plant breeding or genetic engineering as undesirable. Therefore, preferably the fat is obtained from a naturally occurring source wherein the source has not been modified by human intervention.

Fractionated fats are encompassed in the term natural fat as fractionation does not intend to modify the chemical structure of the fat but only separates the fat in different fat fractions.

The edible fat powder according to the invention comprises at least two natural fats, that is from at least two different sources like for example palm oil and palm kernel oil. It will be appreciated that this excludes the combination of the resulting fractions of a fat if this results in the reconstitution of the original fat. Thus for example, if palm oil is fractioned in a stearin and olein fraction, a fat powder consisting of these two fractions will not be a fat powder according to the present invention as in effect the fat powder consists only of one natural fat being the original palm oil (being reconstituted from its fractionated parts). Furthermore a combination of fats from the same source (e.g. palm oil) but of different origin (e.g. Malaysia or Indonesia) is considered to be one natural fat.

Co-Crystallized Fat Powder

We have surprisingly found that a co-crystallized fat powder comprising at least two natural fats has improved physical properties compared to the individual natural fat components. The co-crystallization allows the use of fat components that by themselves are not or less suitable as structuring fat or improves the suitability as structuring fat.

It is essential that the edible fat powder is a co-crystallized fat powder. A mixture of the separately crystallized natural fat components for example may provide edible fat powders that are less suitable as structuring fat compared to the co-crystallized fat powder.

The presence of a co-crystallized fat powder may be characterized by the presence of a single diffraction peak when the Full Width at Half Maximum (FWHM) of the first order long spacing X-ray diffraction peak is derived from the Small Angle X-ray Scattering measurement (SAXS) of the fat powder. A mixture of two separately crystallized natural fat components (i.e. not a co-crystallized fat powder) will result in more than one diffraction peak.

To determine if a fat powder is a co-crystallized fat powder comprising at least two natural fats the co-crystallized fat powder should only show one diffraction peak. When the co-crystallized fat powder is melted and subsequently allowed to slowly crystallize without external cooling the resulting fat will no longer be co-crystallized and will show more than one diffraction peak.

Full Width at Half Maximum (FWHM)

The Full Width at Half Maximum (FWHM) of the first order long spacing X-ray diffraction peak of the edible fat powder according to the invention is derived from the Small Angle X-ray Scattering measurement (SAXS) of the fat powder. The FWHM used, is the FWHM that has been corrected for instrumental line broadening. By correcting for the equipment dependent instrumental line broadening the FWHM is made equipment independent.

Instrumental line broadening is accounted for by correcting the measured FWHM of the fat powder with the FWHM of a reference material. For the correction, the FWHM values as measured for the fat powders are corrected by subtracting the FWHM value of the reference material. For the purpose of the present invention the instrumental line broadening is determined by measuring the 1 1 1 Si reflection of NIST Standard Reference Material 640.

Edible Fat Powder

Edible fat powders according to the invention are free flowing powders at a temperature of about 5 degrees Celsius. The term 'powder' is defined as generally understood by the skilled person.

Edible fat powders according to the invention are fat powders suitable for structuring a fat continuous spread. When used for making a spread, the edible fat powder serves to structure the spread by providing at least part of the structuring fat for the spread. Natural fats as commercially available may comprise minor amounts of other components like for example monoglycerides that are naturally present and may likewise be present in the fat powder.

In addition to these naturally present components the edible fat powder may comprise additional components like for example emulsifier or liquid oil. It will be appreciated that care must be taken to prevent the properties of the fat powder to be detrimentally affected. For example, the presence of liquid oil may affect the ability to form a powder (e.g. may result in a sticky powder or no recognizable powder), depending on the natural fats and the liquid oil as well as the amounts thereof. It is within the reach of the skilled person to determine without undue burden how much of the additional components may be present using common general knowledge.

As the purpose of the fat powder is to provide structure to the spread it may be preferred not to include too many and/or too much of additional components that do not primarily add to the structuring ability of the fat powder, like for example protein and carbohydrates. Preferably the fat powder comprises not more than 20 wt % of protein and/or carbohydrates, more preferably not more than 15 wt %, even more preferably not more than 10 wt %, and still more preferably not more than 5 wt %. Most preferably no protein and carbohydrates are present.

As the presence of water may complicate the production of edible fat powders according to the invention it is preferred that the amount of water is not more than 20 wt %, preferably not more than 10 wt % and more preferably not more than 5 wt %. Most preferably no water is present.

Natural Fats

Edible fat powders according to the invention contain at least two natural fats with a N10 of at least 10%. Preferably at least two natural fats each are present in an amount of at least 20 wt %, more preferably at least 30 wt % and even more preferably at least 40 wt %. The edible fat powder may comprise more than two natural fats, like for example three or four, but preferably two of the natural fats are present in a weight ratio from 20:80 to 80:20 calculated on the total weight of the two natural fats, more preferably from 30:70 to 70:30, even more preferably from 40:60 to 60:40 like for example 50:50. Preferably the edible fat powder mainly consists of natural fat and more preferably only consists of two or more natural fats. In a preferred embodiment the edible fat powder consists of two natural fats.

The present invention allows the use of natural fats for structuring purposes that on their own are not or less suitable for that purpose or require modification like for example (partial) hydrogenation or interesterification. For example, just mixing a steep melting fat and a slow melting fat will generally not result in a fat mixture with acceptable structuring capacity or may result in an end product with suboptimal organoleptic properties. Interesterification is e.g. widely used to modify the chemical composition of mixtures comprising a steep melting fat and a slow melting fat to improve the physical properties of the fat mixture. The present invention provides a means to eliminate the need to chemically modify the fat.

The edible fat powder preferably comprises a first natural fat having a N40 of less than 8% like for example less than 5%, less than 3% or less than 1% and a second natural fat having a N40 of more than 2% like for example more than 3%, more than 5% or more than 10%.

The edible fat powder preferably comprises a first natural fat comprising at least 25 wt % of lauric acid (C12:0) and myristic acid (C14:0) and a second natural fat comprising at least 25 wt % of palmitic acid (C16:0) and stearic acid (C18:0).

The natural fat may be of vegetable, animal or marine origin. Preferably the natural fat is selected from the group consisting of vegetable fat, dairy fat and marine fat. More preferably the natural fat is selected from the group consisting of vegetable fat and dairy fat. Most preferably the natural fat is a vegetable fat.

Preferably the natural fat is selected from the group consisting of palm fat, allan blackia, pentadesma, shea butter, coconut oil, soybean oil, rapeseed oil and dairy fat. More preferably the natural fat is selected from the group consisting of palm oil, palm kernel oil, palm oil fraction, palm kernel fraction, coconut oil and dairy fat fraction. Even more preferably the natural fat is selected from the group consisting of palm oil, palm kernel oil, palm oil fraction, palm kernel fraction and coconut oil.

The fat powder according the invention may comprise other fat components like for example liquid oil in addition to the natural fat. Preferably at least 50 wt % of the total amount of fat is vegetable fat, more preferably at least 70 wt %, still more preferably at least 90 wt %, even still more preferably at least 95 wt % and even still more further preferably essentially all of the fat is of vegetable origin Triacylglycerols Edible fats contain a large number of different triacylglycerols (TAG's) with varying physical properties. The TAG's in edible fats are composed of fatty acids with an even number of carbon atoms in the chains, varying between 4 and 24 in number. Common fatty acids from vegetable origin are C10, C12, C14, C16, C18, C20 and C22, and most common TAG's are composed of these fatty acids. Moreover each fatty acid can contain up to three double bonds at certain positions in the chain. Especially fish oil contains a high number of unsaturated fatty acids with more than one unsaturated bond in the chain.

Based on physical properties, TAG's can be grouped as follows:

G1: H3
G3: H2M
G4: H2(U+Sh)
G7: HM2
G10: M3
G11: M2(U+Sh)
G12: HMU
G13: H(U+Sh)2+M(U+Sh)2
G14: (U+Sh)3

Wherein H represents the saturated longer chains (C16 and higher), M the middle melting chains (C10-C14) and Sh the Short chains (C4-C8). U stands for an unsaturated chain.

The groups G1, G3, G4 and G7 are the most important for the structuring of edible fat containing foods. Preferably in edible fat powders according to the present invention the weight amount on total fat of G4+G7 triacylglycerols is equal to or below (A*(G1+G3 triacylglycerols)+B), wherein A is −0.49 and B is 48.3. More preferably A is −0.49 and B is 44, still more preferably A is −0.49 and B is 41.5, even still more preferably A is −0.58 and B is 48.3 and even still more further preferably A is −0.7 and B is 48.3.

Making of Edible Fat Powders According to the Invention

Suitable methods to prepare the fat powder include for example cryo-crystallization, in which atomized liquid droplets come in contact with liquid nitrogen causing the droplets to instantaneously solidify, and Super Critical Melt Micronisation (ScMM), also known as particles from gas saturated solutions (PGSS). ScMM is a commonly known method and is for example described in J. of Supercritical Fluids 43 (2007) 181-190 and EP1651338.

We have surprisingly found that a co-crystallized fat powder comprising at least two natural fats has improved physical properties. Therefore a further aspect of the invention relates to a process for the preparation of an edible fat powder wherein the edible fat powder is prepared from a molten mixture comprising at least two natural fats. We have found that when a fat powder is prepared from a molten mixture comprising at least two natural fats, the natural fats will co-crystallize.

Preferably the edible fat powder is prepared from a molten mixture comprising at least two natural fats using supercritical melt micronisation. Edible fat powder according to the invention preferably are fat powders obtainable by supercritical melt micronisation Suitable fat powders may be prepared using ScMM taking care that the amount of dissolved CO2 is relatively high like for example 20, 25, 30 or 35 wt %. This is a function of the pressure and temperature of the CO2-melt mixture. It is beneficial to keep the difference between the temperature of the nozzle and the crystallization temperature of the structuring fat close to each other. Furthermore, it is beneficial to use enough external cooling gas.

It is important that the fat powder is not subjected to temperatures at which the structuring fat melts as this severely reduces the ability to structure. This temperature depends on the fat as used and can routinely be determined for example based on the solid fat content profile (i.e. N-lines) of the structuring fat. Preferably the edible fat powder, after production, is not subjected for prolonged periods of time to temperatures above 25 degrees Celsius, more preferably 15 degrees Celsius, even more preferably 10 degrees Celsius and most preferably 5 degrees Celsius.

Use of Edible Fat Powders

Edible fat powders according to the invention are fat powders suitable for structuring a fat containing emulsion allowing the use of natural fats without the need to improve their structuring ability by modifying the chemical structure of said natural fats.

Therefore in a further aspect the invention relates to the use of the edible fat powders according to the present invention to prepare a fat containing emulsion. Preferably the emulsion further comprises an aqueous phase and more preferably the emulsion is a water in oil emulsion comprising from 5 to 80 wt % fat, preferably 10 to 60 wt % and more preferably from 20 to 40 wt %. Preferably the emulsion is a fat continuous spread.

A suitable process is for example a process for the preparation of an edible fat continuous spread comprising an aqueous phase, comprises the steps of:
a. mixing fat powder and oil wherein the fat powder comprises structuring fat to provide a slurry;
b. providing an aqueous phase;
c. mixing the slurry and aqueous phase to form an oil continuous emulsion;
wherein the fat powder is an edible fat powder according to the invention.

Preferably the slurry is kept at a temperature equal to or below 25 degrees Celsius, and the aqueous phase is cooled prior to mixing to such an extent that the temperature of the mixture of slurry and aqueous phase is kept equal to or below 25 degrees Celsius.

Another suitable process is for example a process for the preparation of an edible fat continuous spread comprising an aqueous phase comprises the steps of:
a. providing an aqueous phase containing all the ingredients except for the edible fat powder;
b. mixing the aqueous phase and the edible fat powder to form a continuous emulsion;
wherein the fat powder is an edible fat powder according to the invention.

Preferably the aqueous phase is cooled prior to mixing to such an extent that the temperature of the mixture of the edible fat powder and aqueous phase is kept equal to or below 25 degrees Celsius.

Preferably the spread comprises from 5 to 50 wt % fat, more preferably 10 to 35 wt % and most preferably 15 to 30 wt %.

The oil in the slurry or in the aqueous phase is liquid oil and may be single oil or a mixture of different oils, and may comprise other components. Preferably at least 50 wt % of the oil (based on total amount of oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

The invention is now illustrated by the following non limiting examples.

EXAMPLES

Full Width at Half Maximum (FWHM)

The Full Width at Half Maximum (FWHM) of the first order long spacing X-ray diffraction peak of the edible fat powder according to the invention is derived from the Small Angle X-ray Scattering measurement (SAXS) of the fat powder according to the following protocol.

The FWHM of the fat powder was measured on a Bruker D8 Discover X-ray diffractometer with GADDS (General Area Detector Diffraction System) (ex Bruker AXS, Delft, NL) (Part No: 882-014900 Serial No: 02-826) in a theta/theta configuration. A copper anode was used, and the K-alpha radiation with wavelength 0.15418 nm was selected.

The X-ray source and the GADDS-detector were positioned at 0 degrees 2 Theta, to realize transmission measurements. To prevent the detector from being hit by the primary beam a lead beam stopper was precisely positioned in the middle and just in front of the detector.

The fat powder was measured at 5 degrees Celsius using a Linkam temperature stage (model THMS 600, from Linkam Scientific Instruments Ltd, UK). The fat powder sample was enclosed by X-ray Mylar film (Chemplex Cat. NO: 100 (2.5 µm), from Chemplex Industries Inc) in the sample holder of the Linkam stage by using a spacer having a thickness of 2.5 mm and a diameter of 8.5 mm. The Linkam stage was modified such that the hole is sufficiently big to allow the diffraction beam to reach the detector. The removable tray of the Linkam stage and the spacer were cooled in a refrigerator to 5 degrees Celsius prior to the measurement. The spacer was filled at 5 degrees Celsius with fat powder with a metal spatula that was cooled to 5 degrees Celsius prior to use. The Linkam stage was positioned on the x,y,z table of the D8 Discover and the liquid nitrogen pump and heating module were placed in the cabinet during measurements.

The instrumental parameters as used are shown in the table below.

TABLE 1

| D8 Discover instrumental parameters for fat powder measurements | |
|---|---|
| Theta 1 (degrees) | 0.000 |
| Theta 2 (degrees) | 0.000 |
| Detector Bias (kV) | 40 |
| Detector Bias (mA) | 40 |
| Measuring time (seconds) | 150 |
| Collimator (mm) | 0.3 |
| Detector distance (cm) | 25 |
| Tube Anode | Cu |

In a 2-Theta range from 1 degree to 10 degrees the diffraction signal was measured.

One dimensional X-ray diffraction patterns were determined from the 2D images using the GADDS software (version 4.1.28). The obtained X-ray diffraction patterns were imported in the Bruker EVA software (version 12.0) and the FWHM was determined.

The FWHM of the fat powder samples as measured with the Bruker D8 was corrected for instrumental line broadening. The correction factor is determined using the FWHM of the 1 1 1 Si reflection of NIST Standard Reference Material 640.

The correction factor for the Bruker D8 Discover X-ray diffractometer with GADDS as used was determined to be 0.180 degrees.

Stevens Value

Stevens values give an indication about the hardness (also called firmness) of a product. The Stevens value is determined according to the following protocol.

Freshly prepared products are stabilized at 5 degrees Celsius. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Spreadability

Spreadability is determined according to the following protocol.

A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Free Water

After spreading a sample of a fat spread, the stability of the emulsion after spreading is determined by using indicator paper (Wator, ref 906 10, ex Machery-Nagel, DE) which develops dark spots where free water is adsorbed.

A stable product does not release any water and the paper does not change.

Very unstable products release free water easily and this is indicated by dark spots on the paper.

A six point scale is used to quantify the quality of fat spread (DIN 10 311):
- 0 (zero) is a very stable and good product;
- 1 (one) is showing some loose moisture (one or two spots, or the paper changes a little in color as a total);
- 2 (two) as one but more pronounced;
- 3 (three) as one but to an almost unacceptable level;
- 4 (four) indicator paper is almost fully changing into a darker color;
- 5 (five) the paper changes completely and very fast into the maximum level of color intensity.

Spreads with a score of 4 or 5 are rejected for their stability. Spreads with a score of 0 or 1 show an acceptable quality with respect to free water.

Moisture Content in Fat Spreads

The moisture content is measured by evaporation of the water at elevated temperature. A Moisture Analyzer type HB43-S (ex Mettler-Toledo GmbH, Laboratory & Weighing Technologies, CH) is used.

The moisture content is determined from the weight loss of a sample dried by heating with a halogen heating module. The sample is about 1-2 gram of product in an aluminum pan with a bed of silver sand of about 3-4 gram and is covered with filter paper. The value is expressed as wt % of moisture in the fat spread.

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) of a log normal water droplet size distribution can be determined. The D3,3 is the volume weighted mean droplet diameter and $\sigma$ is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and $\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for one week. This gives the D3,3 after stabilization at 5 degrees Celsius.

The tube containing the small amount of product, 0.66 gram, is then stored for about 20 hours at 30 degrees Celsius, followed by stabilizing at 5 degrees Celsius for at least one hour. The droplet size is then measured to give the D3,3 after heat stability test at 30 degrees Celsius and re-stabilization at 5 degrees Celsius.

Solid Fat Content (SFC) Measurements

The solid fat content (SFC) in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

Preparation of Edible Fat Powders
Set Up for Batch Wise Production of Fat Powder FIG. 1 is a schematic representation of the set up for the batch wise production of edible fat powder as used for the preparation of fat powder examples 1 to 14. The comparative fat powders were blended from these powders.

The set-up consists of an autoclave (6) with a content of 600 ml (Premex Reactor AG HPM-PT-060, Wno. 14571, Art no. PT.060.462.45, ex Premex, CH) equipped with a mechanical stirrer (7) (six blade propeller stirrer, length 10.6 cm, 1 cm×1 cm blades of 1.5 mm thick). The autoclave has connections at the top and at the bottom. The top connection (8) was used to pressurize the system with CO2. The mixture from the vessel is expelled from the bottom of the autoclave via tube (10) through valve (9) over nozzle (2) (orifice 0.34 mm SIA80/core SKA16/cap CPP37729-SS, ex Spraying Systems, Ridderkerk, NL) to about atmospheric pressure in an expansion vessel (1) (main section: height 26.1 cm and diameter 60 cm, conical bottom part: height 37 cm and diameter from 60 cm to 15 cm). The dimensions of the tube between the bottom of the autoclave and the nozzle are (3 cm vertical, 20 cm horizontal, 3 cm vertical, 4 mm inner diameter, 6 mm outer diameter).

The autoclave is heated with an oil bath with heat transfer fluid. Tube (10) and nozzle (2) are kept at the desired temperature by heating tape (1.5 meters/5 mm wide Isopad SiS-10 CE/SN:02401022774/PN:328552-000, from Isopad BV/Tyco Thermal, Wijk bij Duurstede, NL) using a Thyristor to adjust the temperature of the heating tape.

The expansion vessel is cooled with additional CO2 over inlet (3). A small barrel (5) (15 liters, model 729348-90, from Vink, Lisse, NL) for collection of the sprayed powder is mounted at the bottom of the expansion vessel. The gas in the expansion vessel leaves the vessel via a tube shaped membrane filter (4) (polypropylene, length 25.5 cm, outer diameter 6 cm, inner diameter 2.5 cm) thereby keeping the pressure inside the expansion vessel at atmospheric pressure.

Preparation of Fat Powders

The system (i.e. autoclave) was adjusted to the desired temperature and pressure. The temperature of tube (10) and nozzle (2) was set at a temperature above the melting temperature of the fat mixture using the Thyristor. The fat mixture (300 gram) was melted and the melted fat mixture was then poured into the autoclave. The autoclave was closed and the mixture was stirred with the mechanical stirrer at the desired speed. Liquid CO2 was added over connection (8) in steps of 30 bar till the desired working pressure is reached and the system was left till a steady state condition was reached (i.e. constant pressure and temperature, see Table 2). The expansion vessel was cooled to the desired temperature with CO2 gas over inlet (3). The CO2-melt mixture was expanded (i.e. sprayed) over nozzle (2) to atmospheric pressure in expansion vessel (1) and external CO2 gas (3) at the top of the expansion vessel was used for additional cooling to keep the expansion vessel at the desired temperature. Upon expansion of the CO2-melt mixture into the expansion vessel the evaporation of dissolved CO2 and the entrainment of CO2 into the spray caused crash-cooling conditions, which lead to very rapid solidification. The resulting powder was collected in barrel (5) below the expansion vessel and stored at a temperature of minus 20 degrees Celsius. The gas left the expansion vessel via membrane filter (4). The temperature and the pressure as measured in the autoclave dropped upon expansion (as mentioned in Table 2).

Fat powder examples 1 to 8 are co-crystallized fat powders made from a mixture of two fats (see Table 2). Fat powder examples 9 to 14 are single crystallized fat powders made from a single fat (see Table 2). Fat powders 9 to 14 were used to blend fat powder comparative examples C1 to C7 (containing two fats, but not co-crystallized) (see Table 3).

TABLE 2

Prepared fat powders

| Ex. | Fat Mix | A | B | C | D | E |
|---|---|---|---|---|---|---|
| 1 | 35 wt % mfPOs/ 65 wt % PK | 350, 57, 180 | 379 | 2'43", −21.8 | 84 | 1026 |
| 2 | 50 wt % mfPOs/ 50 wt % PK | 350, 64, 180 | 285 | Nm | nm | 1087 |
| 3 | 65 wt % mfPOs/ 35 wt % PK | 350, 65, 180 | 337 | Nm | nm | 1058 |
| 4 | 20 wt % full hydro PO/ 80 wt % full hydro PK | 350, 60, 180 | 367 | 2'34", −22.3 | 90 | 929 |
| 5 | 50 wt % dfPOs/ 50 wt % PK | 350, 51, 180 | 361 | 2'32", −21.2 | 92 | 1165 |
| 6 | 50 wt % indfPOs/ 50 wt % PK | 350, 51, 180 | 399 | 2'32", −23.2 | 94 | 1014 |
| 7 | 40 wt % full hydro PO/ 60 wt % full hydro PK | 350, 51, 180 | 375 | 2'35", −21.4 | 93 | 987 |
| 8 | 35 wt % mfPOs/ 65 wt % dfPKs | 350, 67, 180 | 355 | 2'20", −23.7 | 88 | 844 |
| 9 | dfPOs | 350, 62, 183 | 337 | 2'32", −21.6 | 97 | 966 |
| 10 | PK | 350, 51, 180 | 392 | 2'34", −22.4 | 92 | 1130 |
| 11 | indfPOs | 350, 57, 183 | 376 | 2'30", −22.2 | 88 | 928 |
| 12 | Full hydro PO | 350, 62, 180 | 330 | 2'55", −21.2 | 63 | 959 |
| 13 | Full hydro PK | 350, 49, 180 | 368 | 2'42", −22.7 | 89 | 1035 |
| 14 | mfPOs | 350, 62, 183 | 328 | 2'43", −22.2 | 62 | 903 | mfPOs—multi-fractionated palm oil stearin (top fraction of a multi-stage fractionation process); PK—Palm kernel oil; Full hydro PO—fully hydrogenated palm oil; Full hydro PK—fully hydrogenated palm kernel oil; dfPOs—dry fractionated palm oil stearin (top fraction of a palm oil fractionation process); indfPOs—interesterified dry fractionated palm oil stearin; dfPKs: top fraction of palm kernel oil from a dry fractionation process
A—Autoclave: mixing speed (rpm), temperature (degrees Celsius), pressure (bar)
B—Mass flow CO2 to autoclave (gram)
C—Spray time (min-sec), temperature of expansion vessel (degrees Celsius)
D—Powder yield (obtained powder/used fat, wt %)
E—Total mass flow CO2 for autoclave plus cooling (gram)

TABLE 3

Comparative fat powder examples

| | | | TAG's (wt %) | | |
|---|---|---|---|---|---|
| Ex. | Blend of prepared fat powder | Reference as in Table 2 | G1 + G3 | G4 + G7 | P/S |
| C1 | 35 wt % mfPOs + 65 wt % PK | 14 + 10 | 28 | 18 | 11 |
| C2 | 50 wt % mfPOs + 50 wt % PK | 14 + 10 | 38 | 18 | 13 |
| C3 | 65 wt % mfPOs + 35 wt % PK | 14 + 10 | 50 | 18 | 15 |
| C4 | 20 wt % fully hydro PO + 80 wt % fully hydro PK | 12 + 13 | 33 | 33 | 1 |
| C5 | 50 wt % dfPOs + 50 wt % PK | 9 + 10 | 22 | 30 | 8 |
| C6 | 50 wt % indfPOs + 50 wt % PK | 11 + 10 | 18 | 31 | 8 |
| C7 | 40 wt % fully hydro PO + 60 wt % fully hydro PK | 12 + 13 | 49 | 25 | 1 |

The P over S ratio represents the Palmitic over Stearic fatty acid content in the TAG's. The TAG's of the corresponding blends of the fat powder examples 1 to 8 in Table 2 are identical to the comparative fat powder examples in Table 3 having the same fat blend composition.

TABLE 4

Physical data of edible fat powder examples 1 to 14 and comparative fat powder examples C1 to C7

| Ex. | FWHM |
| --- | --- |
| 1 | 0.576 |
| 2 | 0.555 |
| 3 | 0.516 |
| 4 | 0.671 |
| 5 | 0.507 |
| 6 | 0.474 |
| 7 | 0.874 |
| 8 | 0.532 |
| 9 | 0.387 |
| 10 | 0.412 |
| 11 | 0.387 |
| 12 | 0.458 |
| 13 | 0.554 |
| 14 | 0.411 |
| C1 | 2-peak |
| C2 | 2-peak |
| C3 | 2-peak |
| C4 | 2-peak |
| C5 | 2-peak |
| C6 | 2-peak |
| C7 | 2-peak |

Preparation of Spreads

Spreads with a composition as in Table 5 were made according to the methods as described below using the edible fat powders of examples 1 to 8 and comparative fat powder examples C-1 to C-7 (see Table 6).

TABLE 5

Spreads compositions

| | Composition A1 (parts) | Composition A2 (parts) | Composition B (parts) |
| --- | --- | --- | --- |
| AQUEOUS PHASE | | | |
| Tap water | 66.440 | 66.429 | 54.606 |
| Starch | 4.000 | 4.000 | — |
| Buttermilk powder | 0.100 | 0.100 | 0.150 |
| NaCl | 1.000 | 1.000 | 0.015 |
| Potassium sorbate | 0.130 | 0.130 | 0.090 |
| dfPOflV55 | 1.400 | 1.400 | — |
| Sunflower oil | 1.600 | 1.600 | 1.500 |
| Dimodan HP | 0.300 | 0.300 | 0.100 |
| TOTAL | 74.97 | 74.959 | 56.461 |
| citric acid | 0.030 (pH 5.20) | 0.030 (pH 5.20) | 0.022 (pH 5.14) |
| FAT PHASE | | | |
| Sunflower oil | 20.369 | 22.153 | 37.490 |
| Fat powder | 4.471 | 2.794 | 5.850 |
| Colorant | 0.144 | 0.048 | 0.166 |
| Flavor | 0.016 | 0.016 | 0.011 |
| TOTAL | 25 | 25.011 | 43.517 |

Starch: Merigel 341, modified pre-gelled waxy corn starch (hydroxypropyl distarch) ex Tate & Lyle Europe (pre-gelled starch, needs to be dispersed at 40 to 50 degrees Celsius at low shear)
Dimodan HP: molecularly distilled mono/diacylglyceride mixture derived from fully hardened palm oil (90% monoglyceride) ex Danisco, DK
dfPOflV55: fractionated Palm Oil with iodine value of 55

TABLE 6

Spreads and fat powders used

| Spread example | Fat power used | Composition used |
| --- | --- | --- |
| 1 | 1 | Composition B |
| 2 | 2 | Composition B |
| 3 | 3 | Composition B |
| 4 | 4 | Composition B |
| 5 | 5 | Composition A1 |
| 6 | 6 | Composition A1 |
| 7 | 7 | Composition A2 |
| 8 | 4 | Composition A2 |
| 9 | 8 | Composition A2 |
| C1 | C1 | Composition B |
| C2 | C2 | Composition B |
| C3 | C3 | Composition B |
| C4 | C4 | Composition B |
| C5 | C5 | Composition A1 |
| C6 | C6 | Composition A1 |
| C7 | C7 | Composition A2 |

Spreads Examples 1 to 4 and Comparative Spreads Examples C1-C4

First 24.489 parts (538.76 g) of hot water (80 degrees Celsius) was mixed with 0.150 parts (3.30 g) of butter milk powder, 0.015 parts (0.33 g) of salt and 0.090 parts (1.98 g) of K-sorbate by dispersing the ingredients in the water using the Ultra-turrax.

Then 1.5 parts (33 g) of oil was weighed and together with 0.1 parts (2.20 g) of the emulsifier (Dimodan HP) gently heated to 75 degrees Celsius in a steel can while stirring, followed by adding this blend to the hot water phase part, while using the turrax. The mixture was homogenised and pasteurised using the turrax for 5 to 10 minutes.

The remaining cold part of the water 30.117 parts (662.57 g) was added to the hot water phase while using the turrax, ending up at about 30 degrees Celsius and the pH was adjusted to about 5.2 by slowly adding citric acid.

37.490 parts (824.78 g) of cold oil was mixed with 0.166 parts (3.65 g) of β-carotene (0.4% dispersion) and 0.011 parts (0.24 g) of flavour and added as a fourth step to the emulsion while using the turrax resulting in a homogenous oil in water emulsion.

This finely dispersed oil in water emulsion was then poured in to the Esco-Labor (ESCO-double wall Vacuum mixer processing plant Type EL3 with 4.5 liter vessel in pharmaceutical version, ex ESCO-Labor AG, CH) which was cooled at about 5 degrees Celsius using a cooling machine (Huber HS40 thermostated at 4 degrees Celsius), followed by deaeration for about ten minutes.

Then 5.85 parts (128.70 g) of the edible fat powder was weighed using a pre-cooled (5 degrees Celsius) steel can and scoop and added to the oil in several steps via a funnel at the bottom of the Esco-Labor. The powder was sucked into the mixture using vacuum. After pouring the slurry into a pre-cooled can of 5 degrees Celsius, it was made homogeneous and smooth by applying the Ultra-turrax (T 50 basic ULTRA-TURRAX®, ex IKA® Werke GmbH & Co. KG, DE) for a few minutes at the lowest level of shear, ending at about 8 degrees Celsius.

The mixture was poured into the feed tank of the spreads production line and product was finished by pumping the mixture at about 14 kg/h through a pin stirrer operating at 2400 rpm, with an internal volume of 75 ml and 4 rows of pins on the stator and on the rotor. The inlet temperature was about 13 degrees Celsius and the outlet temperature was about 16 degrees Celsius. The resulting thick and white water in oil emulsion was filled in 200 ccm tubs followed by storage at 5 degrees Celsius.

TABLE 7

Spreads processing conditions for spreads examples 1 to 4 and comparative spreads examples C1 to C4

| Example | 1 | 2 | 3 | 4 | C1 | C2 | C3 | C4 |
|---|---|---|---|---|---|---|---|---|
| Flow (kg/hr) | 14.4 | 14.0 | 14.0 | 16.1 | 14.5 | 14.0 | 14.0 | 17.3 |
| Line Pressure (bar) | 0.8 | 2.4 | 3.0 | 2.0 | 1.0 | 2.3 | 2.6 | 1.9 |
| Temp, inlet mixer* (° C.) | 14.6 | 13.4 | 12.6 | 14.8 | 13.3 | 12.9 | 12.8 | 14.6 |
| Temp, after mixer* (° C.) | 17.8 | 16.3 | 15.6 | 18.4 | 17.3 | 15.8 | 16.5 | 18.5 |

*mixer is a 75 ml pin stirrer with 4 rows of pins on stator and on rotor

Examples 5 to 9 and Comparative Examples C5 to C7

Slurry Preparation

First 1.8 kg of a slurry was made by dispersing the fat powder in cold sunflower oil of about 5 degrees Celsius, while degassing under vacuum.

The oil was weighed and pre-cooled to 5 degrees Celsius in an Esco-Labor (ESCO-Vacuum mixer processing plant Type EL3 with 4.5 liter vessel in pharmaceutical version, ex ESCO-Labor AG, CH). The powder was weighed using a pre-cooled (5 degrees Celsius) vessel and scoop, and added to the oil in several steps via a funnel on top of the Esco-Labor. The powder was sucked stepwise into the oil using vacuum. After each step a valve under the funnel was closed and the pressure dropped significantly. The density of the final slurry was measured to check if the de-aeration process was completed. Sometimes lumps were formed. After pouring the slurry into a pre-cooled can of 5 degrees Celsius, it was made homogeneous and smooth by applying an Ultra-turrax (T 50 basic ULTRA-TURRAX®, ex IKA® Werke GmbH & Co. KG, DE) for a few minutes at the lowest level of shear.

Slurry Phase

Colorant and flavor were added to the slurry as prepared above and the slurry was brought into the fat feed tank of the spreads production line.

The fat feed tank is a double walled stainless steel vessel with an internal diameter of 125 mm and a height of 310 mm, equipped with a ribbon stirrer, pushing the product downwards to the outlet opening in the bottom of the tank. The tank is thermo-stated at 5 degrees Celsius.

Aqueous Phase

The aqueous phase was prepared by mixing three phases (I), (II) and (III).

Phase I being a mixture of about 70% of the water and the starch was prepared in the standard way and cooled to 60 degrees Celsius. Phase II being a mixture of the remainder of the water, Salt, Potassium Sorbate and Butter Milk Powder, was prepared at 75 degrees Celsius and subsequently pasteurized at 75 degrees for 10 minutes. Phase III being a mixture at 80 degrees Celsius of dfPOflV55, a small part of the oil and the emulsifier. The three phases were mixed and the pH adjusted to the desired pH with citric acid by using the Ultra Turrax operating at about 8000 rpm.

Then the mixture was poured into the aqueous feed tank of the spreads production line. The aqueous feed tank is a double walled stainless steel vessel, equipped with an agitator, thermo-stated at 57 degrees Celsius.

Spreads Production

The spreads were made by pumping the content of the fat feed tank and of the aqueous phase feed tank via a junction in to a 75 ml double walled stainless steel pin stirrer, with two rows of 4 stator and rotor pins. The fat phase increasing in temperature up to about 16 degrees Celsius in line just before the junction point, due to heat generated in the fat pump and due to ambient conditions and length of feeding pipes. The aqueous phase being cooled inline down to about 8 degrees Celsius prior to mixing with the fat phase.

Initially the fat phase was pumped into this system including the pin stirrer to fill it completely. Then both phases were pumped into the system at the required ratio using 2 gear pumps. After the junction point the mixture is pumped at about 16 kg/h, into the pin stirrer, which results in a residence time of 17 seconds in the stirrer. The pin stirrer is thermo-stated at 14 degrees Celsius and operated at 2800 rpm.

The final product was filled into 150 ml plastic tubs and stored at 5 degrees Celsius.

TABLE 8

Spreads processing conditions for examples 5 to 9 and comparative examples C5 to C7

| Ex. | Flow fat phase (kg/hr) | Flow aqueous phase (kg/hr) | Temp. fat phase # (° C.) | Temp. aqueous phase # (° C.) | Temp. pin stirrer in (° C.) | Temp. pin stirrer out (° C.) | Moisture content (wt %) |
|---|---|---|---|---|---|---|---|
| 5 | 4 | 12 | 16.9 | 7.9 | 12.6 | 15.2 | 67.7 |
| 6 | 4 | 12 | 15.9 | 9.5 | 12.6 | 15.4 | 68.4 |
| 7 | 4 | 12 | nm | 8.6 | 12.5 | 15.2 | 67.3 |
| 8 | 4 | 12 | 21.5 | 8.8 | 10.8 | 15.9 | 67.7 |
| 9 | 4 | 12 | 19.5 | 9.0 | 11.0 | 15.5 | 67.6 |
| C5 | 4 | 12 | 17.6 | 8.1 | 11.7 | 14.8 | 68.5 |
| C6 | 4 | 12 | 15.9 | 8.8 | 13.0 | 15.1 | 67.6 |
| C7 | 4 | 12 | nm | 8.9 | 11.9 | 15.0 | 66.2 |

As measured at the junction point.

Results

The hardness, spreadibility, free water and the droplet size (D3,3) after stabilization at 5 degrees Celsius as well as after a heat stability test at 30 degrees Celsius and re-stabilization at 5 degrees Celsius was determined for each of the spreads according to the methods as described above.

TABLE 9

Spreads analyses

| Ex. | Hardness | Spreadibility | Free water | D3,3 5 degrees Celsius @ | D3,3 30/5 degrees Celsius @@ |
|---|---|---|---|---|---|
| 1 | 15 | 0.5 | 0.5 | 13 | 16 |
| 2 | 28 | 1 | 0 | 6 | 7 |
| 3 | 29 | 1 | 0 | 7 | 7 |
| 4 | 62 | 1 | 0 | 7 | 7 |
| 5 | 61 | 1 | 0 | 8 | 38 |
| 6 | 130 | 1.5 | 0.5 | 7 | 51 |
| 7 | 59 | 1 | 0 | 7 | 7 |
| 8 | 67 | 1 | 0 | 8 | 10 |
| 9 | 72 | 1 | 0 | 8 | 44 |
| C1 | Too soft | Too soft | 3 | 21 | Free oil |
| C2 | 18 | 1.5 | 0 | 8 | 9 |
| C3 | 18 | 1 | 0.5 | 8 | 8 |
| C4 | 74 | 1.5 | 0 | 7 | 7 |

TABLE 9-continued

Spreads analyses

| Ex. | Hardness | Spreadability | Free water | D3,3 5 degrees Celsius @ | D3,3 30/5 degrees Celsius @@ |
|---|---|---|---|---|---|
| C5 | 42 | 3.5 | 3.5 | 65 | Free water |
| C6 | 18 | 2.5 | 4 | 59 | 100 |
| C7 | 58 | 1 | 0 | 7 | 7 |

@ D3,3 determined after stabilization at 5 degrees Celsius.
@@ D3,3 determined after a heat stability test at 30 degrees Celsius and re-stabilization at 5 degrees Celsius.

The invention claimed is:

1. Process for the preparation of an edible fat powder, which process comprises the steps of:

Preparing a mixture of at least two fats which have not been interesterifed with each other having a N10 of at least 10%, each fat being present in an amount of at least 20%; and spraying a CO2-melt mixture of the fats having dissolved CO2 into a vessel to form the fat powder.

* * * * *